(12) United States Patent
Huang (10) Patent No.: US 7,104,809 B1
(45) Date of Patent: Sep. 12, 2006

(54) MEMORY CARD SHAPED CARD READER

(75) Inventor: Der-Sheng Huang, Taipei (TW)

(73) Assignee: Datafab Systems Inc., Pingzhen (TW)

( * ) Notice: Subject to any disclaimer, the term of this patent is extended or adjusted under 35 U.S.C. 154(b) by 0 days.

(21) Appl. No.: 11/282,572

(22) Filed: Nov. 21, 2005

(30) Foreign Application Priority Data

Oct. 18, 2005 (TW) .............................. 94217959 U (51) Int. Cl.
*H01R 12/00* (2006.01)

(52) U.S. Cl. ...................... 439/76.1; 439/951; 439/142

(58) Field of Classification Search ............... 439/76.1, 439/135, 142, 630, 638, 945, 946, 951
See application file for complete search history.

(56) References Cited

U.S. PATENT DOCUMENTS

| | | | |
|---|---|---|---|
| 6,808,424 B1 * | 10/2004 | Kaneshiro et al. | 439/638 |
| 6,813,164 B1 * | 11/2004 | Yen | 361/785 |
| 6,890,188 B1 * | 5/2005 | Le | 439/76.1 |
| 6,908,038 B1 * | 6/2005 | Le | 235/492 |
| 6,944,028 B1 * | 9/2005 | Yu et al. | 361/737 |

* cited by examiner

*Primary Examiner*—Thanh-Tam Le
(74) *Attorney, Agent, or Firm*—Bacon & Thomas, PLLC (57) ABSTRACT

The present invention is to provide a circuit board in a housing and a plurality of contacts fixedly mounted on each of one end, the other end, and at least one side of the circuit board by surface mounting for forming a first external connector, a second external connector, and at least one internal connector wherein each of the first and the second external connectors is exposed to be ready for connection, at least one insertion slot is formed in the housing and, in response to inserting a memory card (e.g., T-Flash Card) into the insertion slot, a plurality of contacts of the internal connector are electrically connected to a plurality of conductive terminals of the memory card. Further, a shield is pivotally formed at the second external connector projected from the other end of the circuit board wherein the shield and the housing are assembled together to have a size dimensioned to comply with the specifications of a first type of memory card (e.g., Memory Stick Card or SD Card).

11 Claims, 6 Drawing Sheets

MEMORY CARD SHAPED CARD READER

FIELD OF THE INVENTION

The present invention relates to card readers and more particularly to a memory card shaped card reader complying with the specifications of a first type of memory card (e.g., Memory Stick Card or SD Card) and capable of being inserted with a second type of memory card (e.g., T-Flash Card) as an adapter of the second type of memory card for inserting into one insertion slot complying with the specifications of a first type of memory card.

BACKGROUND OF THE INVENTION

Various memory cards having different specifications are commercially available. Memory cards can be classified as large memory cards and small memory cards based on size. Large memory cards comprise MMC (MultiMediaCard), CF (CompactFlash™ Card), SD (Secure Digital), SM (Smart Media), and MS (Memory Stick) available from SONY Corporation. MMCs, CFs, and SDs not only have large market shares but also are widely used as main memory cards in DSCs (Digital Still Cameras), MP3 players, and other multimedia devices. Also, the specifications of SD and MMC are complied with the miniaturization of Smart Phone. Thus, SD and MMC are taken as standard storage devices by major mobile phone manufacturers such as Samsung Electronics, Nokia, and Motorola. Regarding small memory cards, they comprise miniSD, microSD (T-Flash), RSMMC, MMC micro, MS Duo, and Memory Stick Micro (M2). Small memory cards are advantageous for being compact, lightweight, energy saving, durable, and rewritable. Thus, small memory cards are widely mounted in various portable electronic products including PDA (Personal Digital Assistant), DSC, Digital Music player, and Smart Phone. Further, small memory cards have certain advantages and relatively large market shares because they concentrate on markets different from that of large memory cards.

Figure 1:
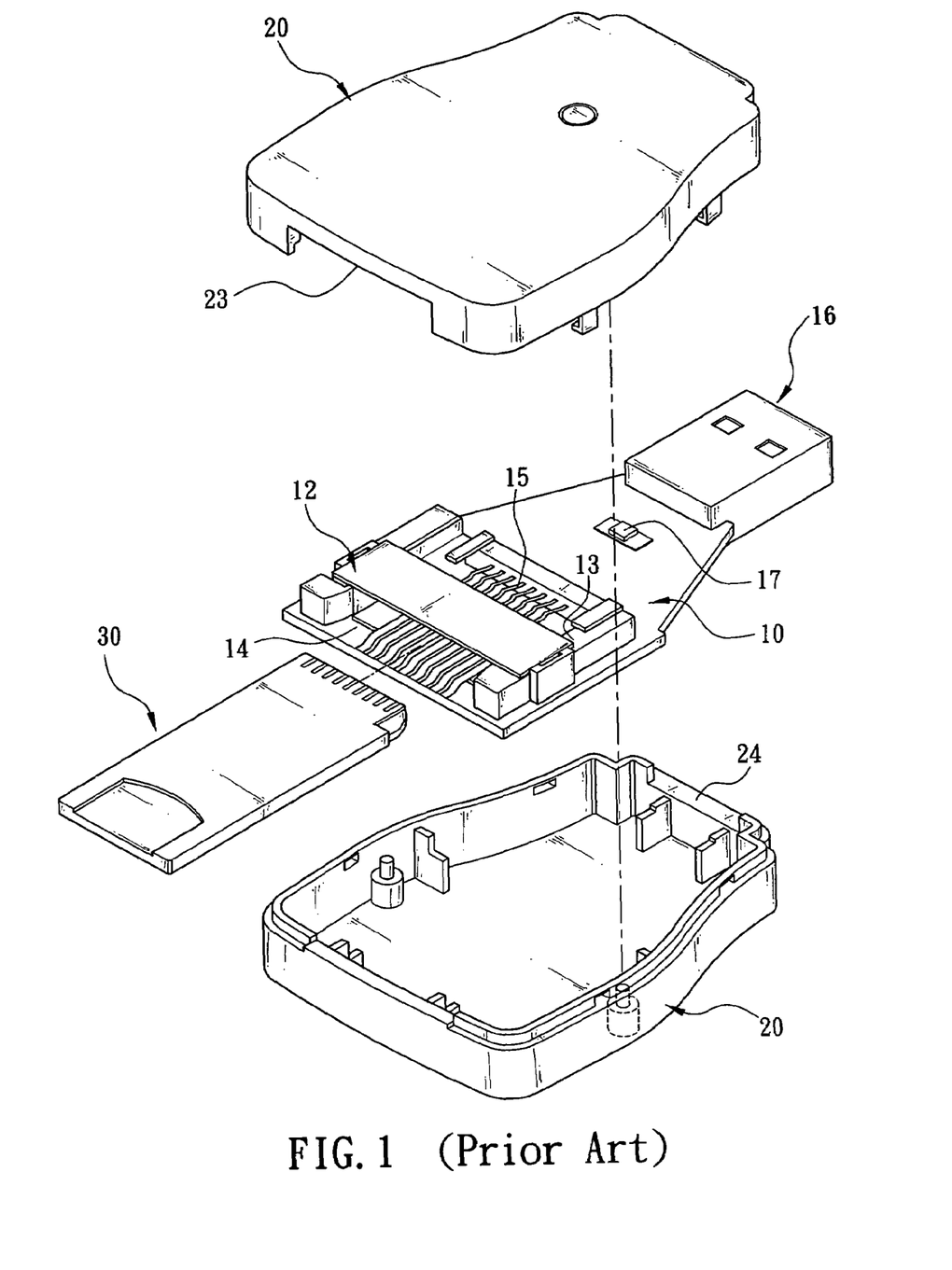
FIG. 1 is an exploded view of a conventional card reader.

A variety of card readers for reading data from memory cards are commercially available. A conventional card reader is shown in FIG. 1 and comprises a circuit board 10, a housing 20, a USB (Universal Serial Bus) connector 16, and a port 12. The circuit board 10 is mounted in the housing 20. The housing 20 comprises a front opening 23 aligned with the mouth of the port 12. A memory card 30 is adapted to insert in the port 12 through the opening 23. The housing 20 further comprises a rear opening 24. The USB connector 16 is projected from the rear opening 24 to expose from the housing 20. The USB connector 16 is adapted to insert into a USB port of a notebook computer (not shown). An inner end of the USB connector 16 is fixedly formed with the circuit board 10 and is electrically connected thereto. An outer end of the USB connector 16 is extended out of the circuit board 10. The port 12 is fixedly formed above the circuit board 10 and is disposed opposite the USB connector 16. The port 12 comprises a seat 13, an insertion slot 14 in the seat 13, and a plurality of metal contacts 15 electrically connected to the seat 13 which is electrically connected to the circuit board 10 again. As such, in response to inserting the memory card 30 in the insertion slot 14, a plurality of conductive terminals (not shown) of the memory card 30 are in contact with the contacts 15. Next, insert the USB connector 16 into a notebook computer (not shown). A CPU (central processing unit) of the notebook computer is adapted to read data from the memory card 30 or write data thereinto via the connected USB connector 16, the circuit board 10, and the contacts 15. Moreover, referring to FIG. 1 again, at least one LED (light emitting diode) 17 is mounted on the circuit board 10. The LED 17 is adapted to emit light for indicating an operating state of the card reader in response to inserting the memory card 30 in the insertion slot 14 and inserting the USB connector 16 into the notebook computer.

As stated above, memory cards having different specifications are adapted to operate in conjunction with various electronic products. Thus, card readers having different specifications are available on the market for meeting different needs of vast users. For example, a user has a number of different electronic products (e.g., DSC, PDA, Smart Phone, etc.) each having a unique insertion slot for receiving an inserted memory card having different specifications in order to read data from the memory card (e.g., SD, Memory Stick, microSD (T-Flash), etc.). However, the user is not able to either operate an electronic product to read data from a memory card having different specifications inserted into the insertion slot of the electronic product or operate a notebook computer to read data from a memory card having different specifications inserted into the USB connector of the notebook computer. Thus, with respect to each electronic product a user has to buy a number of suitable adapters or card readers having different specifications in cooperation therewith in order to read data from a memory card having different specifications inserted into the insertion slot. Inevitably, users have to spend more money on buying these devices (i.e., bear a great financial burden upon users) and it is very inconvenient in use. A card reader capable of reading one of a variety of memory cards is also commercially available recently. The card reader has a plurality of insertion slots having different specifications for reading data from many memory cards having different specifications. However, this type of card reader is expensive, bulky, and not easy to carry. It is thus a waste for a user to buy such unpractical card reader since the user may never have a chance to use certain or even many insertion slots of the card reader to read data from inserted memory cards.

In view of above, it is thus desirable among card reader manufacturers to provide a card reader such that a user may operate a notebook computer to read data from a memory card having certain specifications via a USB connector of the notebook computer or write data into the memory card, and the user may also take the card reader as an adapter for the memory card and insert same into an insertion slot complied with the specifications of a different memory card of another electronic product in order to read data from the memory card or write data thereinto via another electronic product. By configuring as above, a number of advantages are obtained when a user only has to carry a memory card shaped card reader. The advantages include obtaining features of both card reader and adapter, carrying an adapter and a card reader at the same time being not necessary, and saving money.

SUMMARY OF THE INVENTION

After considerable research and experimentation, a memory card shaped card reader having a low manufacturing cost, simple manufacturing processes and circuitry, greatly reduced size, and features of both card reader and adapter according to the present invention has been devised so as to overcome the above drawbacks (e.g., complicated mechanism, high cost, and bulkiness) of the prior card reader.

It is an object of the present invention to provide a circuit board in a housing and a plurality of contacts fixedly mounted on each of one end, the other end, and at least one side of the circuit board by surface mounting for forming a first external connector, a second external connector, and at least one internal connector wherein each of the first and the second external connectors is exposed to be ready for connection. At least one insertion slot is formed in the housing. In response to inserting a memory card (e.g., T-Flash Card) into the insertion slot, a plurality of contacts of the internal connector is electrically connected to a plurality of conductive terminals of the memory card. Further, a shield is pivotally formed at the second external connector projected from the other end of the circuit board wherein the shield and the housing are assembled together to have a size dimensioned to comply with the specifications of a first type of memory card (e.g., Memory Stick Card or SD Card).

It is another object of the present invention to assemble the shield and the housing together such that the plurality of contacts of the first external connector are electrically connected to corresponding conductive terminals in an insertion slot of an electronic device when the first external connector of the card reader is inserted into the insertion slot of the electronic device complied with the specifications of the first type of memory card.

It is yet another object of the present invention to disengage the second external connector projected from the other end of the circuit board with the shield such that the exposed second external connector of the card reader is adapted to insert into an insertion slot of a notebook computer complied with the specifications of a connector for electrically connecting the corresponding contacts of the second external connector to conductive terminals in the insertion slot of the notebook computer.

It is a further object of the present invention to provide a first opening and a second opening on the upper shell wherein the first opening is disposed corresponding to the first external connector so as to expose the first external connector to be ready for connection, and the second opening is disposed corresponding to the second external connector so as to expose the second external connector to be ready for connection.

The above and other objects, features and advantages of the present invention will become apparent from the following detailed description taken with the accompanying drawings.

DETAILED DESCRIPTION OF THE PREFERRED EMBODIMENTS

Figure 2:
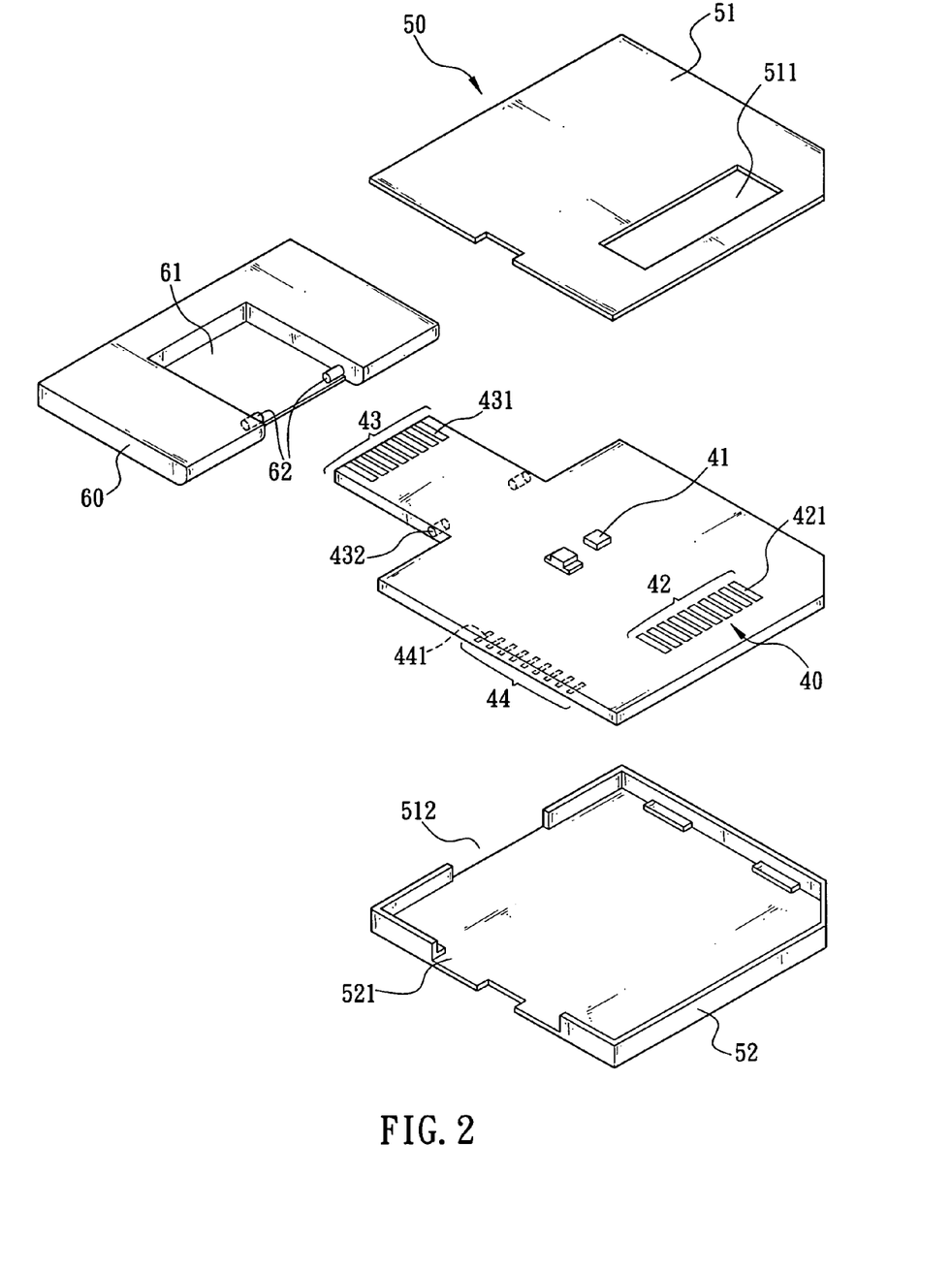
FIG. 2 is an exploded view of a first preferred embodiment of memory card shaped card reader according to the invention.

Referring to FIG. 2, a memory card shaped card reader in accordance with a first preferred embodiment of the invention comprises a circuit board 40 having required circuitry (not shown) and a controller 41 such that the card reader can be additionally configured as an adapter for memory card. A plurality of parallel contacts 421 are fixedly mounted on a specific position on the circuit board 40 proximate one end thereof by surface mounting. The contacts 421 are collectively formed as a first external connector 42 complied with the specifications of a first type of memory card (e.g., Memory Stick available from SONY Corporation having dimensions of 21.5×50.0×2.8 mm or SD having dimensions of 24×32×2.1 mm). Also, a plurality of parallel contacts 431 are fixedly mounted on another specific position on the circuit board 40 at the other opposite end thereof by surface mounting. The contacts 431 are collectively formed as a second external connector 43 complied with the specifications of a connector (e.g., USB connector). Further, a plurality of parallel contacts 441 are fixedly mounted on a specific position on the circuit board 40 at one side thereof by surface mounting. The contacts 441 are collectively formed as at least one internal connector 44 complied with the specifications of a second type of memory card (e.g., T-Flash Card having dimensions of 15×11×1 mm). The specifications of the second type of memory card are different from that of the first type of memory card. Also, size of the second type of memory card is smaller than that of the first type of memory card. Referring to FIG. 2 again, the card reader further comprises a housing 50 including an upper shell 51 and a lower shell 52. An internal space formed by the upper and lower shells 51 and 52 is adapted to receive the circuit board 40 and enclose most portions of the circuit board 40. On the upper shell 51 there are provided a first opening 511 and a second opening 512. The first opening 511 is disposed corresponding to the first external connector 42 so as to expose the contacts 421 of the first external connector 42 and the contacts 421 are thus adapted to connect to a device. The second opening 512 is disposed corresponding to the second external connector 43 extended from the housing 50 so as to expose the contacts 431 of the second external connector 43 and the contacts 431 are thus adapted to connect to a device. On the lower shell 52 there is provided at least one insertion slot 521 disposed corresponding to the internal connector 44. A plurality of conductive terminals of the memory card is electrically connected to the contacts 441 of the internal connector 44 when a memory card having the specifications of a second type memory card (e.g., T-Flash Card) is inserted into the insertion slot 521. Moreover, referring to FIG. 2 again, in the embodiment the card reader further comprises a shield 60 having a recess 61 dimensioned to receive a projected end of the circuit board 40 with the second external connector 43 formed thereat.

Figure 3:
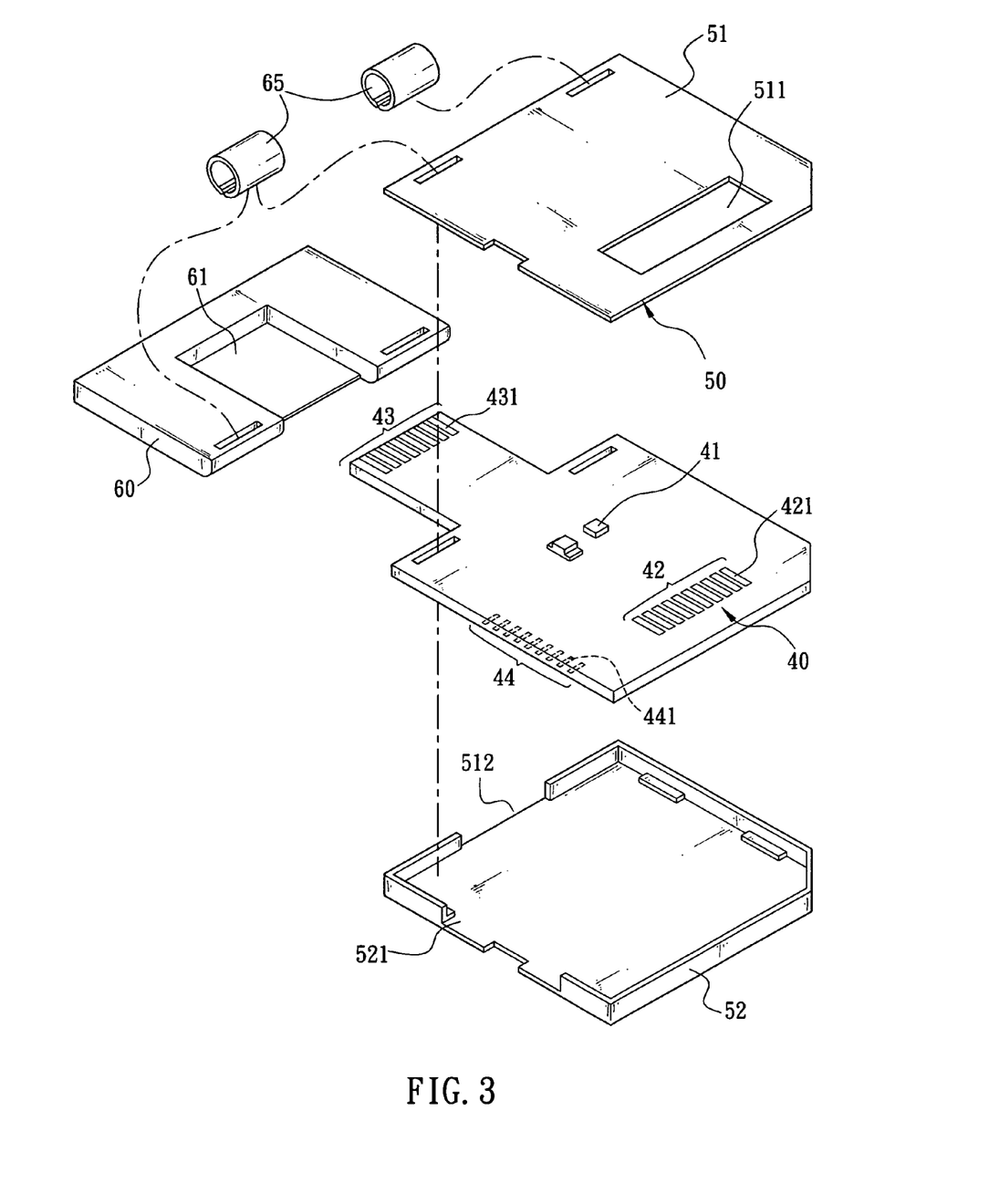
FIG. 3 is an exploded view of a second preferred embodiment of memory card shaped card reader according to the invention.
Figure 4:
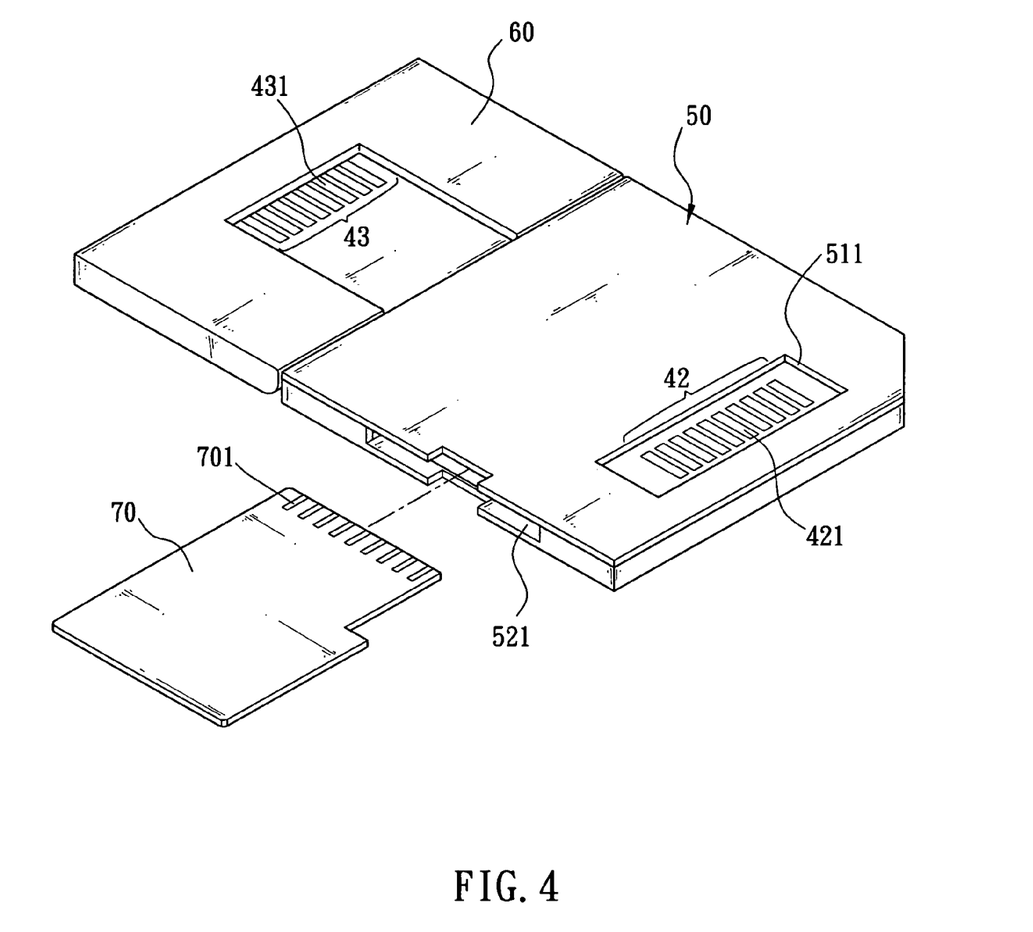
FIG. 4 is a perspective view of the assembled card reader of FIG. 2 served as an adapter for being ready to receive a memory card.

Referring to FIGS. 2, 3, and 4, an assembly process of the above components according to the invention is detailed below. First, place the circuit board 40 in the space formed by the upper and lower shells 51 and 52. Next, snap the upper shell 51 onto the lower shell 52 to form a housing 50 with most portions of the circuit board 40 being enclosed therein excluded the first external connector 42 disposed in the first opening 511 and the second external connector 43 disposed in the second opening 512 each to be ready to connect to a device. The insertion slot 521 is adapted to receive an inserted memory card 70 having specifications of a second type of memory card (e.g., T-Flash Card). Thus, a plurality of conductive terminals 701 of the memory card 70 are electrically connected to the contacts 441 of the internal connector 44. Next, two inward projected shafts 62 formed at two opposite sides of the recess 61 proximate to its mouth are inserted into two holes 432 at two opposite sides of the second external connector 43 proximate the main portion of the circuit board 40. As such, the shield 60 is pivotal to the housing 50. Also, the second external connector 43 projected from the other end of the circuit board 40 is adapted to receive in the recess 61 of the shield 60 to assemble as a whole in which the shield 60 and the housing 50 together form a size complied with the required dimensions of the first type of card reader (e.g., Memory Stick Card or SD Card).

Referring to FIG. 3, a second preferred embodiment of the invention is shown. The shield 60 is pivotally connected to the other ends of the circuit board 40 and the housing 50 by means of two hinges 65. As such, the second external connector 43 projected from the other end of the circuit board 40 is adapted to receive in the recess 61 of the shield 60 when the shield 60 and the housing 50 are assembled together.

Figure 5:
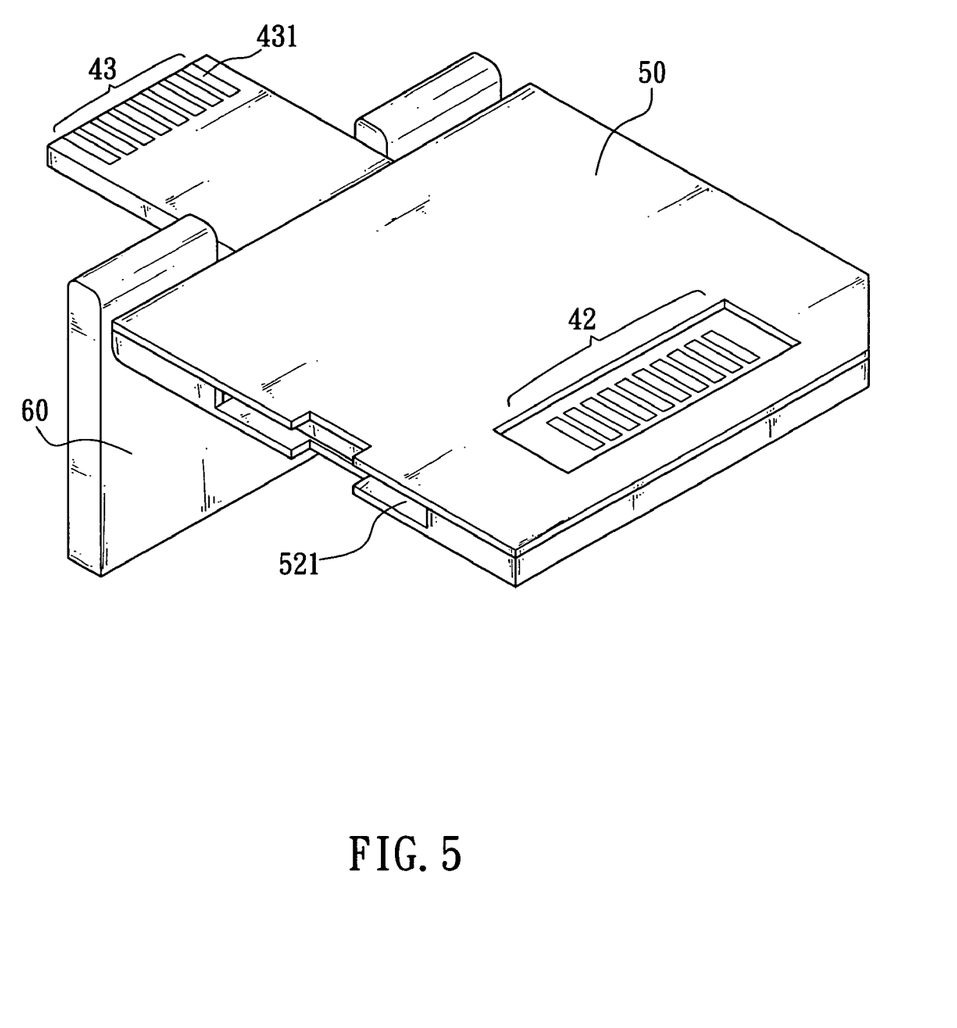
FIG. 5 is a perspective view of the assembled card reader of FIG. 2 served as a card reader.

Referring to FIGS. 3 and 4 again, in operating the memory card shaped card reader of the invention a user may take the card reader as an adapter. Accordingly, as shown in FIG. 3 the user may turn the shield 60 to receive the second external connector 43 projected from the other end of the circuit board 40 in the recess 61 of the shield 60 when the shield 60 and the housing 50 are assembled together. The size of the assembled shield 60 and the housing 50 is dimensioned to fit in an insertion slot of an electronic device complied with the specifications of the first type of memory card. Also, the plurality of contacts 421 of the first external connector 42 are electrically connected to the corresponding conductive terminals in the insertion slot of the electronic device. Referring to FIG. 5, the memory card shaped card reader of the invention is taken as a card reader. Accordingly, a user may turn the shield 60 to be perpendicular about the housing 50 to disengage the second external connector 43 projected from the other end of the circuit board 40 with the recess 61 of the shield 60. Thus, the second external connector 43 projected from the other end of the circuit board 40 is exposed. The exposed second external connector 43 is adapted to insert into an insertion slot of a notebook computer complied with the specifications of a connector (e.g., USB connector). As an end, the plurality of contacts 431 of the second external connector 43 is electrically connected to the corresponding conductive terminals in the insertion slot of the notebook computer. By configuring as above, the memory card shaped card reader of the invention can have features of both card reader and adapter.

Figure 6:
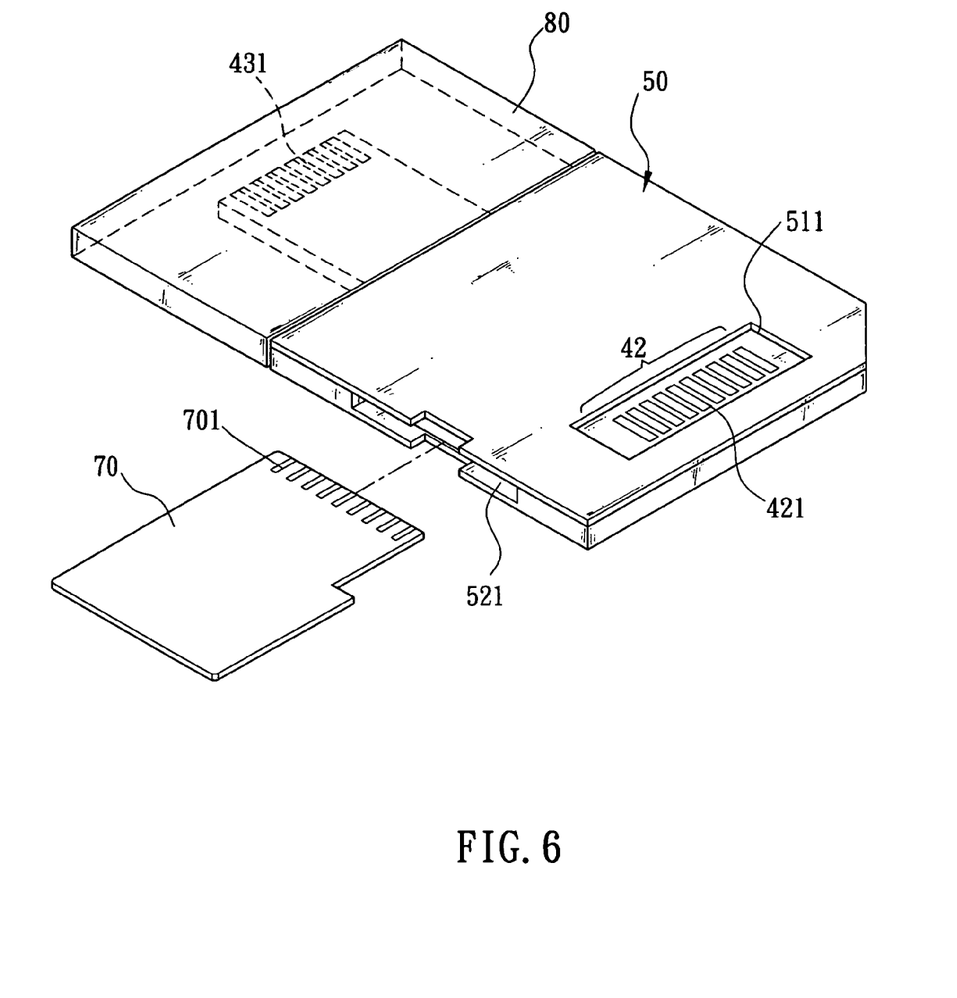
FIG. 6 is a perspective view of a third preferred embodiment of memory card shaped card reader according to the invention to be ready to receive a memory card.

Referring to FIG. 6, a third preferred embodiment of the invention is shown. The memory card shaped card reader comprises the above circuit board 40 (see FIG. 3), the housing 50, and other associated components with required characteristics. Further, the memory card shaped card reader comprises a sheath 80 releasably put on the second external connector 43 projected from the other end of the circuit board 40 for enclosing the second external connector 43. The size of the assembled sheath 80 and the housing 50 is conformed to the required dimensions of the first type of card reader (e.g., Memory Stick Card or SD Card). For taking the card reader as an adapter, a user may put the sheath 80 on the second external connector 43 projected from the other end of the circuit board 40 for assembling the sheath 80 and the housing 50 together. The size of the assembled sheath 80 and the housing 50 is adapted to insert into an insertion slot of an electronic device complied with the specifications of the first type of memory card. Also, the plurality of contacts 421 of the first external connector 42 are electrically connected to the corresponding conductive terminals in the insertion slot of the electronic device. Alternatively, a user may take the memory card shaped card reader as a card reader. Accordingly, the user may remove the sheath 80 from the card reader to expose the second external connector 43 projected from the other end of the circuit board 40 which is adapted to insert into an insertion slot of a notebook computer complied with the specifications of a connector (e.g., USB connector). As an end, the plurality of contacts 431 of the second external connector 43 is electrically connected to the corresponding conductive terminals in the insertion slot of the notebook computer. By configuring as above, the memory card shaped card reader of the invention can have features of both card reader and adapter.

Note that either the shield 60 or the sheath 80 shown above is simply a preferred embodiment of the invention. In practice, either one is not limited to the exact form shown above. Instead, any member capable of releasably assembling with or putting on the second external connector 43 projected from the other end of the circuit board 40 to form a complete assembly which has a size conformed to the dimensions required by the specifications of the first type of card reader is taken as the shield 60 or the sheath 80 of the invention. Referring to FIG. 2 again, the insertion slot 521 is not limited to dispose in either the upper shell 51 or the lower shell 52. Instead, any member disposed in the upper shell 51, the lower shell 52, or a space between the shells 51 and 52 capable of receiving the memory card 70 and electrically connecting to the internal connector 44 falls within the scope of the invention.

In view of the above, the memory card shaped card reader shown and illustrated in the preferred embodiments of the invention is simple in construction. Also, its manufacturing cost is lowest, its size is greatly reduced, and it is portable. In practice, a user may carry a memory card shaped card reader of the invention and operate a notebook computer to read data from a memory card having certain specifications or write data thereinto via a USB connector of the notebook computer, or take the card reader as an adapter for the memory card and insert same into an insertion slot of an electronic device complied with different memory card specifications in order to read data from the memory card or write data thereinto via the electronic device. By configuring as above, features of both card reader and adapter are obtained.

While the invention herein disclosed has been described by means of specific embodiments, numerous modifications and variations could be made thereto by those skilled in the art without departing from the scope and spirit of the invention set forth in the claims.

What is claimed is:

1. A memory card shaped card reader comprising:
   a housing including at least one insertion slot;
   a circuit board provided in the housing and including a plurality of contacts fixedly mounted on each of one end, another end, and at least one side thereof by surface mounting for forming a first external connector, a second external connector, and at least one internal connector, respectively, wherein each of the first and the second external connectors is exposed to be ready for connection, and the internal connector is disposed in the insertion slot such that a plurality of contacts of the internal connector are electrically connected to a plurality of conductive terminals of a memory card when the memory card is inserted into the insertion slot; and a shield pivotally formed at the second external connector projected from the other end of the circuit board wherein the shield and the housing are assembled together to have a size dimensioned to comply with a dimension of a first type of memory card.

2. The card reader of claim 1, wherein the housing further comprises an upper shell, a lower shell, and an internal space formed by the upper and lower shells, the space being adapted to receive the circuit board and enclose most portions of the circuit board, and wherein the upper shell comprises a first opening disposed corresponding to the first external connector, and a second opening disposed corresponding to the second external connector extended from the housing such that the contacts of both the first and the second external connectors are exposed to be ready for connection.

3. The card reader of claim 2, wherein the insertion slot is formed on the housing and is disposed in the insertion slot such that the plurality of contacts of the internal connector are electrically connected to the plurality of conductive terminals of the memory card when the memory card having a dimension of a second type of memory card is inserted into the insertion slot.

4. The card reader of claim 1, wherein the shield comprises a recess at one end, the recess being dimensioned to receive a projected end of the circuit board with the second external connector formed thereat.

5. The card reader of claim 3, wherein the shield comprises a recess at one end, the recess being dimensioned to receive a projected end of the circuit board with the second external connector formed thereat.

6. The card reader of claim 5, wherein a recess comprises two inward projected shafts formed at opposite sides of its mouth, wherein the second external connector comprises two holes at its opposite sides, the hole being adapted to receive the projected shafts for pivotally disposing the shield relative to the housing, and wherein the second external connector projected from the other end of the circuit board is adapted to receive in the recess of the shield to assemble as a whole to have the size dimensioned to comply with the dimension of the first type of memory card.

7. The card reader of claim 3, wherein a recess comprises two inward projected shafts formed at opposite sides of its mouth, wherein the second external connector comprises two holes at its opposite sides, the holes being adapted to receive the projected shafts for pivotally disposing the shield relative to the housing, and wherein the second external connector projected from the other end of the circuit board is adapted to receive in the recess of the shield to assemble as a whole to have the size dimensioned to comply with the dimension of the first type of memory card.

8. The card reader of claim 1, wherein the shield further comprises two hinges for pivotally connecting the shield to the second external connector projected from the other end of the circuit board and pivotally connecting the shield to the other end of the housing, and wherein the second external connector projected from the other end of the circuit board is adapted to receive in a recess of the shield when the shield and the housing are assembled together.

9. The card reader of claim 3, wherein the shield further comprises two hinges for pivotally connecting the shield to the second external connector projected from the other end of the circuit board and pivotally connecting the shield to the other end of the housing, and wherein the second external connector projected from the other end of the circuit board is adapted to receive in a recess of the shield when the shield and the housing are assembled together.

10. The card reader of claim 1, wherein the shield is shaped as a sheath releasably put on the second external connector projected from the other end of the circuit board for enclosing the second external connector, and wherein a size of the assembled sheath and the housing is conformed to dimensions of the first type of card reader.

11. The card reader of claim 3, wherein the shield is shaped as a sheath releasably put on the second external connector projected from the other end of the circuit board for enclosing the second external connector, and wherein a size of the assembled sheath and the housing is conformed to dimensions of the first type of card reader.

* * * * *